(12) United States Patent
Phan et al.

(10) Patent No.: US 10,394,694 B2
(45) Date of Patent: Aug. 27, 2019

(54) UNEXPLORED BRANCH SEARCH IN HYBRID FUZZ TESTING OF SOFTWARE BINARIES

(71) Applicant: FUJITSU LIMITED, Kawasaki-shi, Kanagawa (JP)

(72) Inventors: Quoc-Sang Phan, Mountain View, CA (US); Praveen Murthy, Fremont, CA (US)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/871,955

(22) Filed: Jan. 15, 2018

(65) Prior Publication Data

US 2019/0220387 A1 Jul. 18, 2019

(51) Int. Cl.
*G06F 11/36* (2006.01)

(52) U.S. Cl.
CPC ...... *G06F 11/3664* (2013.01); *G06F 11/3612* (2013.01)

(58) Field of Classification Search
None
See application file for complete search history.

(56) References Cited

U.S. PATENT DOCUMENTS

| | | | | |
|---|---|---|---|---|
| 2009/0007077 | A1* | 1/2009 | Musuvathi | G06F 11/3688 717/130 |
| 2012/0084759 | A1* | 4/2012 | Candea | G06F 11/3612 717/126 |
| 2012/0222013 | A1* | 8/2012 | Zheng | G06F 11/3612 717/125 |
| 2013/0055210 | A1* | 2/2013 | Murthy | G06F 11/3608 717/126 |
| 2015/0269061 | A1* | 9/2015 | Li | G06F 11/3684 717/131 |
| 2018/0004635 | A1 | 1/2018 | Murthy | |

OTHER PUBLICATIONS

"The future of grey-box fuzzing", Isak Hjelt, VT 2017, Bachelor's program in Computing Science (Year: 2017).*
"JDART: Aa Dynamic Symbolic Analysis Framework", Luckow et al., TACS , Apr. 2016 (Year: 2016).*

(Continued)

*Primary Examiner* — Daxin Wu
(74) *Attorney, Agent, or Firm* — Maschoff Brennan

(57) ABSTRACT

A method of branch exploration in fuzz testing of software binaries includes receiving a set of inputs of a binary program under analysis (BPUA) discovered during testing by a grey box fuzzer. The method includes re-executing the set of inputs. The method includes re-executing a concrete execution of the set of inputs in the BPUA and formation of a constraints tree in which path constraints along paths of the BPUA and conditions at branch points are recorded and marked as explored or unexplored. The method includes selecting a particular number of the unexplored branches of the BPUA. The method includes solving the particular number of unexplored branches with a constraint solver to generate a new set of the particular number of inputs. The method includes communicating the new set of the particular number of inputs to the grey box fuzzer for exploration of different branches of the BPUA.

18 Claims, 13 Drawing Sheets

(56) References Cited

OTHER PUBLICATIONS

Unleashing Mayhem on Binary Code. Sang Kil Cha, Thanassis Avgerinos, Alexandre Rebert, David Brumley (Oakland 2012) (May 20, 2012).

Improving search-based test suite generation with dynamic symbolic execution. Juan Pablo Galeotti, Gordon Fraser, Andrea Arcuri (ISSRE 2013) (Oct. 3, 2013).

Driller: Augmenting Fuzzing Through Selective Symbolic Execution. Nick Stephens, John Grosen, Christopher Salls, Andrew Dutcher, Ruoyu Wang, Jacopo Corbetta, Yan Shoshitaishvili, Christopher Krügel, Giovanni Vigna (NDSS 2016) (Feb. 21, 2016).

Jdart: A Dynamic Symbolic Analysis Framework. Kasper Luckow, Marko Dimjasevic, Dimitra Giannakopoulou, Falk Howar, Malte Isberner, Temesghen Kahsai, Zvonimir Rakamaric, Vishwanath Raman. (TACAS 2016) (Apr. 2, 2016).

* cited by examiner

UNEXPLORED BRANCH SEARCH IN HYBRID FUZZ TESTING OF SOFTWARE BINARIES

FIELD

The embodiments discussed herein are related to unexplored branch search in hybrid fuzz testing of software binaries.

BACKGROUND

Binary programs may be tested using automated testing methods. A purpose of testing binary programs may be to discover potential vulnerabilities in the binary programs. Some automated testing methods generate random inputs to test the binary programs. An example of the automated testing methods is fuzz testing. Automated testing of binary programs using random inputs may be a fast method of testing the binary programs. However, the automated testing programs may miss branches of the binary programs. Another automated testing of binary programs may include symbolic execution of the binary program. However, symbolic execution may be slow when compared to the fuzz testing. In addition, symbolic execution may be susceptible to path explosion. Path explosion may occur when the binary program includes too many paths to symbolically explore. Path explosion may result in an incomplete test of the binary program.

The subject matter claimed herein is not limited to embodiments that solve any disadvantages or that operate only in environments such as those described. Rather, this background is only provided to illustrate one example technology area where some embodiments described herein may be practiced.

SUMMARY

According to an aspect of an embodiment, a method of branch exploration in fuzz testing of software binaries may include receiving, by a symbolic execution engine, a set of inputs of a binary program under analysis (BPUA) that is discovered during testing by a grey box fuzzer. The method may include re-executing, by the symbolic execution engine, the set of inputs. The re-executing may include a concrete execution of the set of inputs in the BPUA and formation of a constraints tree in which path constraints along paths of the BPUA and conditions at branch points are recorded and marked as either explored or unexplored. The method may include selecting, by the symbolic execution engine, a particular number of the unexplored branches of the BPUA. The method may include solving, by the symbolic execution engine, the particular number of unexplored branches with a constraint solver to generate a new set of the particular number of inputs. The method may include communicating, by the symbolic execution engine, the new set of the particular number of inputs to the grey box fuzzer for exploration of one or more different branches of the BPUA.

The object and advantages of the embodiments will be realized and achieved at least by the elements, features, and combinations particularly pointed out in the claims. It is to be understood that both the foregoing general description and the following detailed description are exemplary and explanatory and are not restrictive of the present disclosure, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Hybrid fuzz testing is a technique for discovering vulnerabilities in software and in particular program binaries. A hybrid fuzzer includes a combination of symbolic execution and coverage-guided grey-box fuzzer. Generally, the grey-box fuzzer repeatedly executes the program with a large number (e.g., thousands or hundreds of thousands) of inputs. The grey-box fuzzer then records the information about coverage of the software that results from the inputs. When the grey-box fuzzer tests inputs that do not lead to a new execution branch, the grey-box fuzzer may get stuck. At this point, a symbolic execution engine may be used to discover unexplored branches. Following discovery of the unexplored branches, the grey-box fuzzer may continue to mutate (e.g., generate new random inputs) from the discovered branch. Some additional details of a hybrid fuzzer can be found in U.S. application Ser. No. 15/198,064, which is incorporated herein by reference in its entirety. In addition, some other example grey box fuzzers include American Fuzzy Lop and libfuzzer as well as variants thereof. Some additional details of the American Fuzzy Lop can be found at http://lcamtuf.coredump.cx/afl/. Some additional details of libfuzzer can be found at https://llvm.org/docs/LibFuzzer.html.

A challenge in hybrid fuzzing is the determination on which input to call the symbolic execution. For instance, multiple different concrete inputs may lead to the same branch in the software using symbolic execution. Thus, the symbolic execution engine may fail to discover any branches that are new to the grey-box fuzzer. Testing the multiple different concrete inputs only to lead to the same branch wastes computational resources. Moreover, the symbolic execution is a computationally expensive process.

Accordingly, embodiments of the present disclosure collect information from the grey-box fuzzer to guide symbolic execution in hybrid fuzzing. For instance, some embodiments may generate a constraints tree and a graph database. The constraints tree and graph database may record most or all of the inputs and/or explored branches of the software. Use of the constraints tree and the graph database may enable the symbolic execution engine to skip inputs that lead to explored branches. Thus, use of the constraints tree and graph database may limit or prevent symbolic execution of the inputs that lead to previously explored branches and/or paths in the software.

The embodiments described in the present disclosure may accordingly improve the efficiency (e.g., reduce computational resources, increase speed, and the like) of hybrid fuzzing. Additionally, embodiments described in the present disclosure may accordingly improve effectiveness of the hybrid fuzzing. For example, new branches (e.g., new to the grey-box fuzzer) in software may be discovered.

Figure 1:
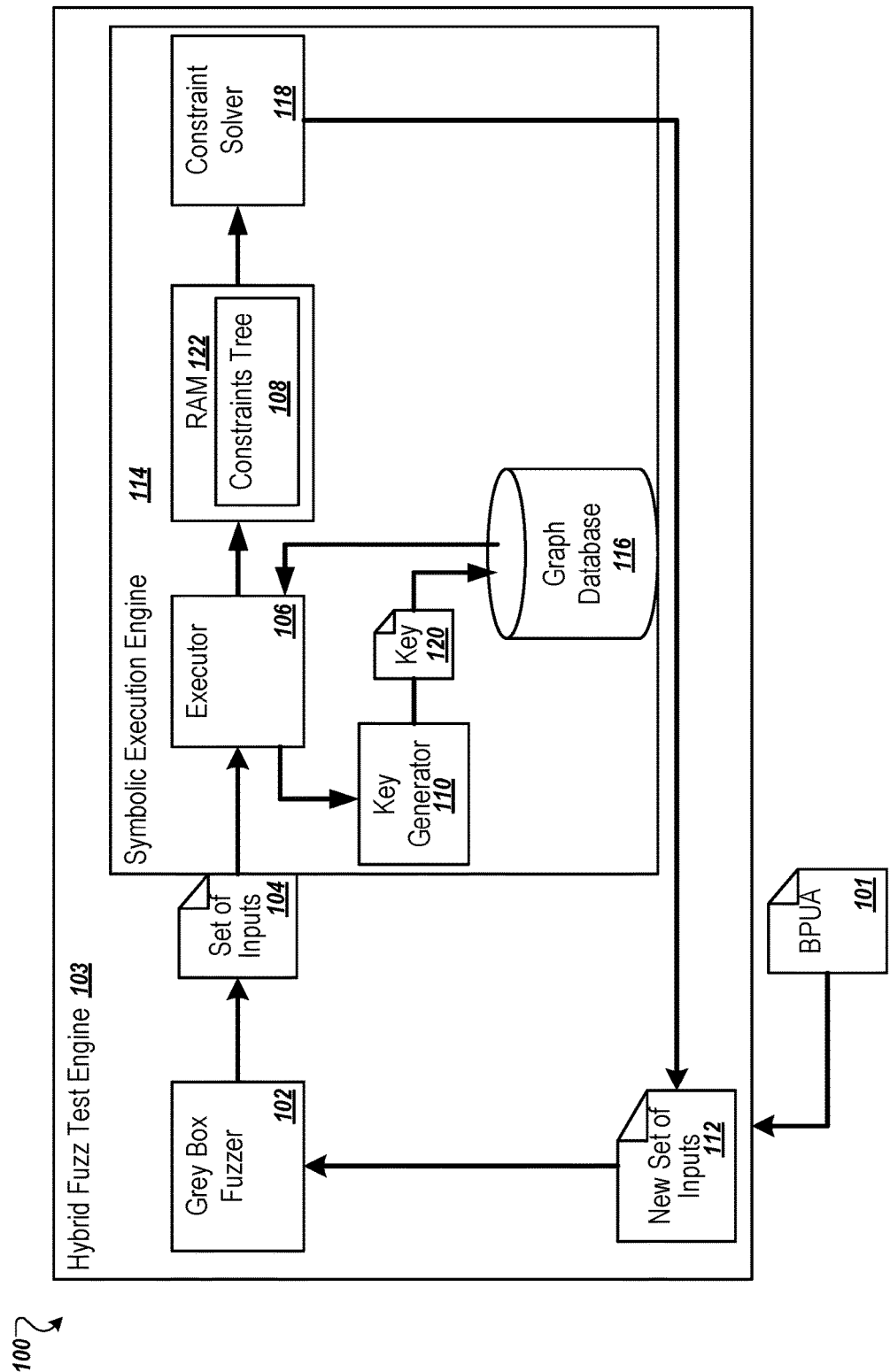
FIG. 1 is a block diagram of an example environment in which an unexplored branch search may be implemented.

FIG. 1 is a block diagram of an example environment 100 in which an unexplored branch search in hybrid fuzz testing may be implemented. The environment 100 may include a hybrid fuzz testing engine 103 that may be configured to execute hybrid fuzz testing of a binary program under analysis (BPUA) 101. The BPUA 101 may include any software program that is tested to discover vulnerabilities and/or test operation of the BPUA 101.

The hybrid fuzz testing engine 103 and one or more components or modules thereof described throughout the present disclosure may be implemented using hardware including a processor, a microprocessor (e.g., to perform or control performance of one or more operations), a field-programmable gate array (FPGA), or an application-specific integrated circuit (ASIC). In some other instances, the hybrid fuzz testing engine 103 may be implemented using a combination of hardware and software. Implementation in software may include rapid activation and deactivation of one or more transistors or transistor elements such as may be included in hardware of a computing system (e.g., depicted in FIG. 6). Additionally, software defined instructions may operate on information within transistor elements. Implementation of software instructions may at least temporarily reconfigure electronic pathways and transform computing hardware.

The environment 100 may include a grey box fuzzer 102 and a symbolic execution engine 114. The grey box fuzzer 102 may be configured to repeatedly execute the BPUA 101 using a random or mutated inputs. The grey box fuzzer 102 measures branch coverage of the BPUA 101 to select interesting inputs. As used with reference to the inputs, the term "interesting" may indicate that the input may be analyzed further. For instance, the interesting input may discover a new path in the BPUA 101. The interesting input may be queued for analysis. The grey box fuzzer 102 may be configured such that if two inputs cover the same branches in the BPUA 101, only one input is retained. The grey box fuzzer 102 may mutate the interesting inputs in the queue. The grey box fuzzer 102 may then execute the BPUA 101 using mutation of the interesting inputs. Execution of the BPUA 101 using the mutations of the interesting inputs may result in a crash of the BPUA 101 and/or exhibition of unwanted behavior by the BPUA 101.

In some circumstances, the grey box fuzzer 102 may be unable to find interesting inputs. An example of these circumstances is when inputs being considered belong to explored paths. Thus, during an initial period of testing, there may be multiple interesting inputs because the number of explored paths is low. However, as more paths of the BPUA 101 are explored, it may become more difficult to find interesting inputs.

In these and other circumstances, the symbolic execution engine 114 may be invoked. The symbolic execution engine 114 may be used to transition the grey box fuzzer 102 to another compartment of the BPUA 101. The term compartment when associated with the BPUA 101 may include a subset of input space. In general, inputs in the same compartment may result in the BPUA 101 exhibiting similar behavior. The grey box fuzzer 102 may discover inputs in the same compartment. However, the grey box fuzzer 102 may have difficulty moving to another compartment without the symbolic execution engine 114.

In some existing symbolic execution engines or white box executors, symbolic execution may fail to discover a new path in the BPUA 101 and may generate new inputs for the grey box fuzzer 102 that are already known. The existing symbolic execution may fail to discover a new path because the existing symbolic execution engines may negate constraints from a single test case at a time. These existing symbolic execution engines do not have a global perspective of the inputs and branches that have been previously explored by the grey box fuzzer 102 or the existing symbolic execution engines. Accordingly, the existing symbolic execution engines cannot efficiently negate conjunctions along a path of the BPUA 101. The existing symbolic execution engines execute interesting inputs and gathers constraints (e.g., branch conditions and transformations on the input). The symbolic execution engines systematically negate branch conditions to determine new inputs that may drive execution in the BPUA 101 along the negated branch. The new inputs may be communicated back to the grey box fuzzer 102. The grey box fuzzer 102 may mutate the new inputs to increase coverage of the BPUA 101.

For instance, in an example, a portion of the BPUA 101 may include:
 if (x>15){o=x+1;}
 else if (x>10) {o=x+2;}
 else if (x<5){x=x+3; if (x>5){abort( )}}
 else {o=x+4;}.

In this example, the grey box fuzzer 102 may output three test cases or inputs: x=16, 13, and 7. An existing symbolic execution engine may re-execute the inputs: x=16, 13, and 7 according to the following expressions:
 x=16: program constraint=(x>15).
 Solving the negation (x<=15) leads to x=12, which is a similar result to x=13.
 x=13: program constraint=(x<=15) and (x>10).
 Solving (x>15): x=18, which is a similar result to x=16.
 Solving (x<=15) and (x<=10): x=8, which is a similar result to x=7.
 x=7: program constraint=(x<=15) and (x<=10) and (x>=5).
 Solving (x>15): x=18, which is a similar result to x=16.
 Solving (x<=15) and (x>10): x=14, which is a similar result to x=13.
 Should solve (x<=15) and (x<=10) and (x<5) to get to abort( ). The inputs 16, 13, and 7 do not lead to the abort( ).

In the expressions, a "similar result" indicates that the new inputs (e.g., 12, 18, 8, and 14) and the re-executed inputs (e.g., 16, 13, and 7) leads to the same program path and/or same sequence of machine instructions. The computational results may be different. However, the computation results are not different enough to lead to another program path and/or a different sequence of machine instructions.

Thus, the symbolic execution of 16, 13, and 7 results in new inputs of 12, 18, 8, and 14. However, the behavior of the BPUA 101 of the new inputs generates a similar result to the inputs 16, 13, and 7 that are already known by the grey box fuzzer 102. Accordingly, re-execution by the existing symbolic execution engines of the inputs 16, 13, and 7 have not resulted in new inputs that are effective to move the grey box fuzzer 102 to another compartment. Additionally, the inputs 16, 13, and 7 did not lead to abort( ).

The symbolic execution engine 114 of FIG. 1 addresses the shortcomings of existing symbolic execution engines described above. For example, the symbolic execution engine 114 includes a constraints tree 108. The symbolic execution engine 114 may collect information from all previous inputs in the constraint tree 108. The symbolic execution engine 114 may then generate new inputs 112, which are then communicated to the grey box fuzzer 102.

In the embodiment of FIG. 1, the symbolic execution engine 114 includes an executor 106, a constraint solver 118, and a key generator 110. The symbolic execution engine 114 supports the constraint tree 108 and a graph database 116. The symbolic execution engine 114 may be configured to perform branch exploration in hybrid fuzz testing of the BPUA 101. The symbolic execution engine 114 may perform the branch exploration based on a set of inputs 104.

The symbolic execution engine 114 may perform concolic execution. Concolic execution is a form of dynamic symbolic execution. The term concolic is a portmaneau of CONcrete and symbOLIC, which indicates that the concolic execution includes concrete execution and symbolic execution. For instance, first, the set of inputs 104 may be executed concretely to collect a trace. For instance to determine whether it follows a true branch or a false branch responsive to a conditional statement. Following the concrete execution, the program may be executed again with a symbol input, instead of a concrete value. The concrete trace may guide the symbolic execution. For example, when there is a condition (x>5), execution with x as a symbol X satisfies both branches X>5 and X<=5. However, a concrete input is x=10 leads to the true branch in the program trace.

The set of inputs 104 may be discovered during fuzz testing by the grey box fuzzer 102. For instance, the set of inputs 104 may include interesting inputs that are discovered by the grey box fuzzer 102 during fuzz testing of the BPUA 101. The interesting inputs may include inputs to the BPUA 101 that discover or lead to new paths in the BPUA 101.

The set of inputs 104 may be received by the symbolic execution engine 114. The executor 106 may be configured to re-execute the set of inputs 104. In some embodiments, re-execution of the set of inputs 104 may include concrete execution of the set of inputs 104 in the BPUA 101. For instance, the concrete execution may include execution of an expression in the BPUA 101 with a variable having the value of an input in the set of inputs 104.

Figure 2:
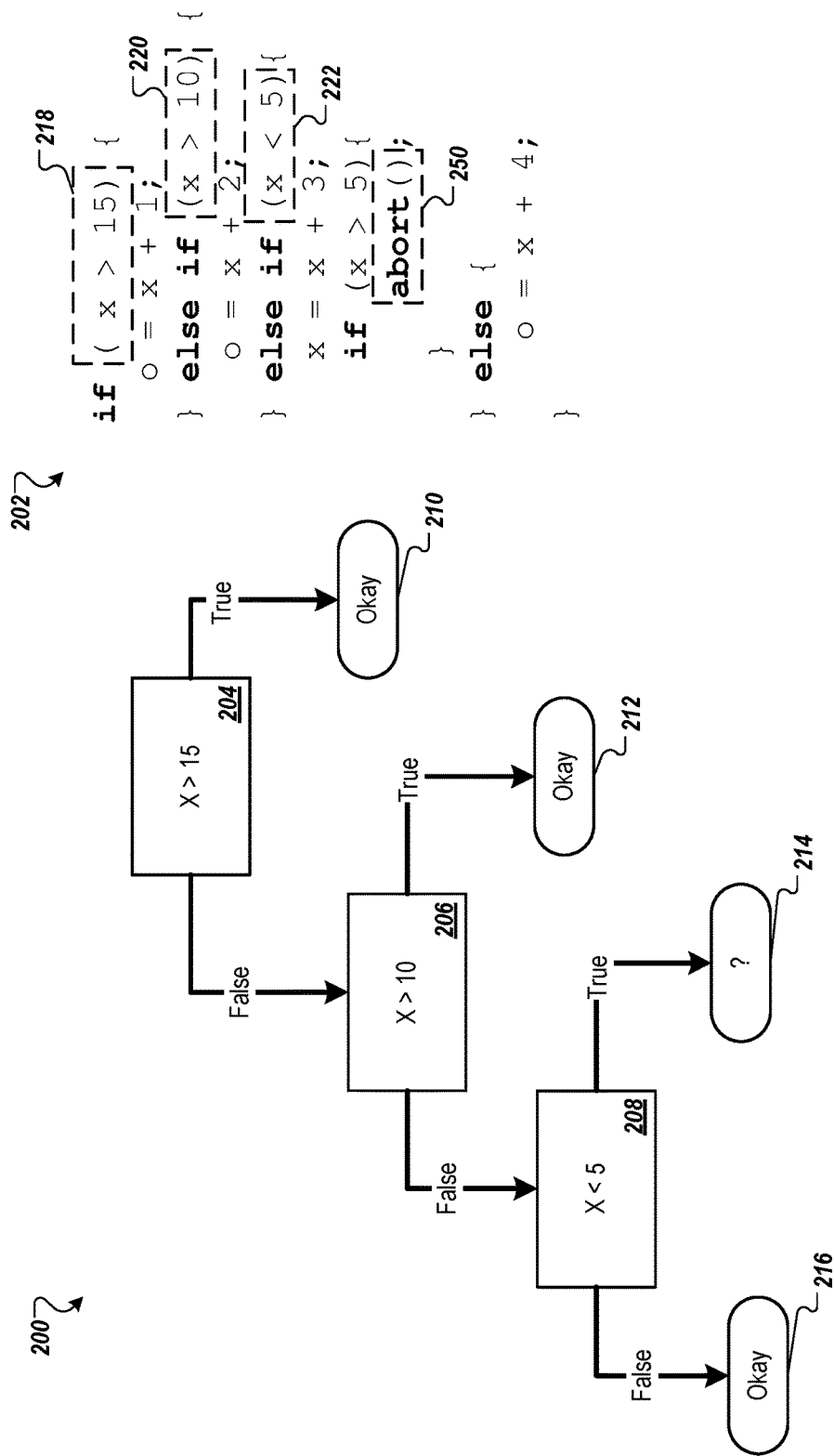
FIG. 2 depicts an example portion of a constraint tree that may be implemented in the environment of FIG. 1.
Figure 3:
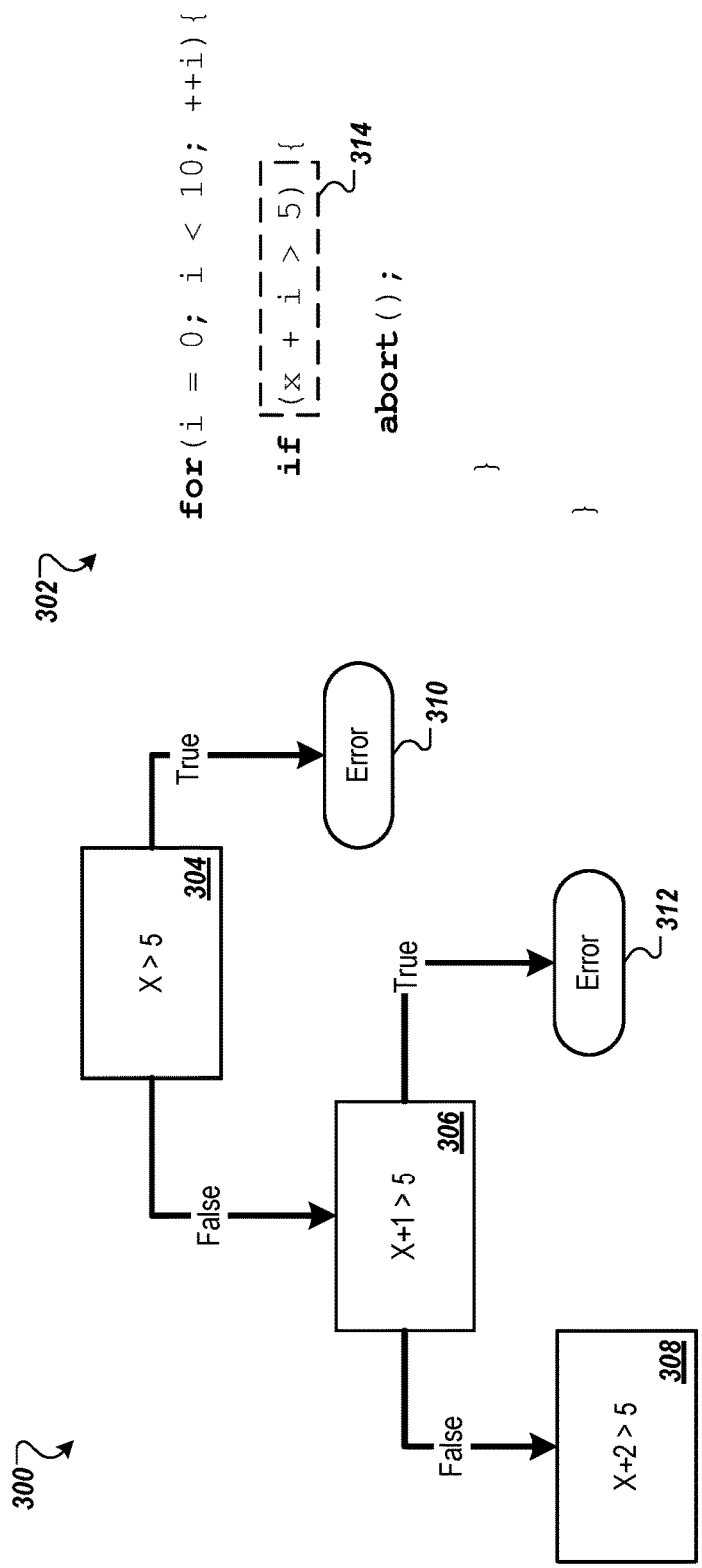
FIG. 3 depicts another example portion of a constraint tree that may be implemented in the environment of FIG. 1.

Additionally, the re-execution of the set of inputs 104 may include formation of the constraints tree 108. The constraints tree 108 may include multiple nodes that include a property of either explored or unexplored. The nodes correspond to statements in the BPUA 101. The statements that correspond to the nodes are not necessarily conditional statements. For instance, the statements may include a statement to check for division by zero or another operation along paths. Some examples of portions of the constraint tree 108 are illustrated in FIGS. 2 and 3, which are discussed below.

In the constraints tree 108, path constraints along paths of the BPUA 101 and conditions at branch points are recorded. Referring to the example portion of the BPUA 101 presented above, the path constraints may include x>15, x>10, and x<5. The conditions at the branching points may include x>15, x<=15, x>10, x<=10, x<5, and x>=5. The path constraints and the conditions at the branch points may be included as nodes in the constraints tree 108. The path constraints and the conditions at the branch points in the constraints tree 108 may be marked as either explored or unexplored. For example, if the input or the set of inputs 104 progresses down the path of the portion of the BPUA 101, the nodes may be marked as explored. If the input or the set of inputs 104 misses the path of the portion of the BPUA 101, the nodes may be marked as unexplored.

In some embodiments, re-execution may include collecting path constraints along a path of the BPUA 101 for one or more inputs of the set of inputs 104. The executor 106 may then add the collected path constraints to the constraints tree 108. The executor 106 may mark the added collected path constraint as explored.

At each of the branch points, the executor 106 may record conditions that are not explored in the path of the BPUA 101. The executor 106 may determine whether the recorded conditions are already present in the constraints tree 108. In response to the condition being present in the constraints tree 108, the executor 106 may skip the recorded condition. For example, the recorded condition is already present in the constraints tree 108. Accordingly, the executor 106 does not duplicate the recorded condition in the constraints tree 108. Instead, the executor 106 skips the recorded condition.

In response to the condition not being present in the constraints tree 108, the executor 106 may add the condition to the constraints tree 108. The conditions that are added to the constraints tree 108 may be marked as unexplored.

The constraint solver 118 may be configured to generate a new set of inputs 112 for the grey box fuzzer 102. To generate the new set of inputs 112, the constraint solver 118 may select a particular number of unexplored branches. For example, the constraint solver 118 may select unexplored branches of the BPUA 101 based on the information in the constraints tree 108. The particular number of unexplored branches may be small (e.g., between about one and three).

In some embodiments, the constraint solver 118 processes one constraint at a time. The processing of one constraint may result in one new input. Accordingly, solving the particular number of constraints of the particular number of unexplored branches may result in the particular number of new inputs in the new set of inputs 112.

In some embodiments, the particular number may be adjustable. For example, the particular number may have a first value (e.g., three) when the symbolic execution engine 114 receives a first set of inputs 104. Subsequently, the particular number may be increased (e.g., increased from three to four) or decreased (e.g., from three to two) when the symbolic execution engine 114 receives a second set of inputs 104.

The constraint solver 118 may solve the particular number of unexplored branches. Solving the unexplored branches may generate the new set of inputs 112. The constraint solver 118 may determine values of the new set of inputs 112 that allow the unexplored branches to be reached. For instance, in the example portion of the BPUA 101 provided above, to reach the abort( ) branch, the new set of inputs 112 may include four. The input four satisfies the conditions (x<=15) and (x<=10) and (x<5) to get to abort( ).

The constraint solver 118 may communicate the new set of inputs 112 to the grey box fuzzer 102. The grey box fuzzer 102 may use the new set of inputs 112 for exploration of one or more different branches of the BPUA 101. The new set of inputs may include the particular number of new inputs. Again, the particular number may be adjustable and/or optimized.

The constraints tree 108 may be stored in random access memory (RAM) 122. For instance, in embodiments in which an amount of memory is not limited, the constraints tree 108 may be stored in RAM 122. Storage in RAM 122 may enable relatively fast access to information included in the constraints tree 108.

In some embodiments, the executor 106 may be configured to determine whether an amount of memory used by the constraints tree 108 exceeds a particular threshold. In response to an amount of memory dedicated to the constraints tree 108 exceeding the particular threshold, the executor 106 may store the constraints tree in the graph database 116. The graph database may be based on Neo4J®, OrientDB®, or another suitable graph database structure. Additionally, storage of the constraints tree 108 in the graph database 116 may mitigate path explosion.

In addition, in response to an amount of memory dedicated to the constraints tree 108 exceeding the particular threshold, the executor 106 may delete one or more sub-trees of the constraint tree 108. To delete the one or more sub-trees of the constraint tree 108, the executor 106 may determine whether every branch in the sub-tree is marked as explored. In response to a determination that every branch in the sub-tree is marked as explored, the executor may prune the sub-tree from the constraint tree 108. The executor 106 may use a remaining portion of the constraints tree 108 as a cache.

In some embodiments, following the storing of the constraints tree 108 in the graph database 116, the re-execution of the set of inputs 104 may change. The re-execution following the storage of the constraints tree 108 in the graph database 116 may be similar to the re-execution described above. However, the re-execution following the storage of the constraints tree 108 in the graph database 116 may include querying the graph database 116 to determine whether a branch has been explored.

For example, in some embodiments, the re-execution following the storage of the constraints tree 108 in the graph database may include determining whether a concrete valuation of an input of the set of inputs 104 leads to a particular branch. In response to the concrete valuation of the input leading to the particular branch, the executor 106 may determine whether an alternative branch to the particular branch is present in the constraint tree. The alternative branch may include a branch in the BPUA 101 that is available as an alternative, but not executed based on the set of inputs 104. For instance, with reference to the example portion of the BPUA 101, the alternative branch of the first constraint (x>15) is the remaining expressions that are executed if the input is less than or equal to 15. In response to the alternative branch not being present in the constraint tree 108, the executor 106 may query the graph database 116 for the alternative branch. In response to the alternative branch not being present in the graph database 116 and not being present in the constraint tree 108, the alternative branch may be added to both the graph database 116 and the constraint tree 108. In response to the alternative branch not being present in the graph database 116 and marked as unexplored, the executor 106 may load the alternative branch to the constraints tree 108.

The alternative branches that are loaded to the constraints tree 108 may be selected by the constraint solver 118. As described above, the constraint solver 118 may then generate the new set of inputs 112 based on the selected branches.

In addition, in some embodiments, the constraint tree 108 may be deleted. For instance, in response to the constraints tree 108 being explored, the constraints tree may be deleted. The executor 106 may query the graph database 116 for unexplored branches that may be related to the constraints tree 108. The executor 106 may load the unexplored branches to the RAM 122. The unexplored branches may be selected by the constraint solver 118.

The key generator 110 may be configured to generate a key 120. The key 120 may be generated for each of the path constraints in the graph database 116. The key 120 may include a string or a bit vector data that is mapped to the path constraints in the graph database 116. The key 120 indicates a sequence of true and false nodes along the path in the BPUA 101 to reach a current node that corresponds to the path constraints from a root node. In some embodiments, for each true node between the current node and the root node, a binary one (1) may be added to the key 120 and for each false node between the current node and the root node, a binary zero (0) is added to the key 120. For instance, there may be five nodes between a root node and a first path constraint that corresponds to a current node. To arrive at the current node, a first of the five nodes may be true, a second of the five nodes may be true, a third of the five nodes may be false, a fourth of the five nodes may be true, a fifth of the five nodes may be false. Accordingly, the key 120 for the current node may be 1-1-0-1-0. In some embodiments, the binary zero (0) may correspond to each true node and the binary one (1) may correspond to each false node. The key 120 may be mapped to the first path constraint in the graph database 116. The root node may be a result of a true branch condition. Accordingly, the root node may generally have a true condition. Some additional details of generation of the key 120 are provided with reference to FIGS. 4 and 11.

The key 120 may be used to search the graph database 116. For example, the executor 106 may be configured to re-execute a concrete value. The key generator 110 may generate the key 120 based on the branches chosen by the concrete values. For instance, the key 120 may be generated to be 1-0-0-0 (corresponding to true→false→false→false). The executor 106 may then search the graph database 116 for a negation branch or alternative branch to the concrete value. The negative branch or alternative branch may have a key 120 that is 1-0-0-1 (corresponding to true→false-→false→true). The executor 106 may then determine whether the negation branch or the alternative branch is already present in the graph database 116 and/or whether the graph database 116 is explored or unexplored.

Branches and symbolic paths in the constraint tree 108 and the graph database 116 may be identified by path constraints. The branches and the symbolic paths may be substantially unique. The key 120, which represents an encoding of the path constraints, may accordingly be substantially unique. Thus, two or more paths having the same keys may be identical. Thus, the keys 120 may be used to determine whether branches and symbolic paths have already been evaluated.

Modifications, additions, or omissions may be made to the environment 100 without departing from the scope of the present disclosure. For example, the environment 100 may include one or more hybrid fuzz test engines 103, one or more grey box fuzzers 102, one or more symbolic execution engines 114, or any combination thereof. Moreover, the separation of various components and servers in the embodiments described herein is not meant to indicate that the separation occurs in all embodiments. For example, the executor 106 and the key generator 110 may be a single component. Moreover, it may be understood with the benefit of this disclosure that the described components and servers may generally be integrated together in a single component or server or separated into multiple components or servers.

FIG. 2 depicts an example portion of a constraint tree (tree portion) 200 that may be implemented in the environment 100 of FIG. 1. For instance, the tree portion 200 may be a part of the constraint tree 108 of FIG. 1. The tree portion 200 is depicted with a portion of a BPUA (BPUA portion) 202. The tree portion 200 is constructed by executing the BPUA portion 202 with the inputs x=16, 13, and 7 as described above. The tree portion 200 depicts a sequence through nodes 204, 206, and 208. The sequence through the nodes 204, 206, and 208 may correspond to a sequence or a series of operations in the BPUA portion 202 with the inputs x=16, 13, and 7.

For example, the tree portion 200 includes the three nodes 204, 206, and 208. A first node 204 may correspond to a first path constraint 218 of the BPUA portion 202. A second node 206 may correspond to a second path constraint 220 of the BPUA portion 202. A third node 208 may correspond to a third path constraint 222 of the BPUA portion 202. The tree portion 200 depicts a sequence through the nodes 204, 206, and 208 that corresponds to the BPUA portion 202 with the inputs x=16, 13, and 7.

In particular, the tree portion 200 includes a true option and a false option at each of the nodes 204, 206, and 208. If the first node 204 is true, then there is a particular value determined for o (e.g., "o=x+1") at path 210. The path 210 may be a result of executing the input of x=16. For instance, 16>15 (true at 204) which leads to 210.

If the first node 204 is false, the sequence proceeds to the second node 206. If the second node 206 is true, then there is a particular value determined for o (e.g., "o=x+2") at path 212. The path 212 may be a result of executing the input x=13. For instance 13<=15 (false at 204) and 13>10 (true at 206), which leads to 212.

If the first node 204 is false and the second node 206 is false, then the sequence proceeds to the third node 208. If the third node 208 is false, then there is a particular value determined for o (e.g., "o=x+4") at path 216. The path 216 may be a result of executing the input x=7. For instance, 7<=15 (false at 204), 7>=10 (false at 206), and 7>=5 (false at 208), which leads to the path 216. If the third node 208 is true, then there is an abort operation 250 in the BPUA portion 202. The abort operation is represented in FIG. 2 by path 214. The path 214 may be selected by a constraint solver such as the constraint solver 118 of FIG. 1. The constraint solver may be configured to generate a new input based on solving the path 214.

FIG. 3 depicts another portion of an example constraint tree (loop tree portion) 300 that may be implemented in the environment 100 of FIG. 1. The loop tree portion 300 may be a part of the constraint tree 108 of FIG. 1. The loop tree portion 300 is depicted with a portion of a BPUA 302 that includes a loop for the variable 'i.' The portion of a BPUA 302 is referred to as a "BPUA loop portion." The loop tree portion 300 includes nodes 304, 306, and 308. Each of the nodes corresponds to a path constraint of the BPUA loop portion 302 with a value of a loop variable.

For instance, the loop tree portion 300 includes the three nodes 304, 306, and 308. A first node 304 may correspond to a path constraint 314 of the BPUA loop portion 302 with a first value of i (e.g., i==0). A second node 306 may correspond to the path constraint 314 of the BPUA loop portion 302 with a second value of i (e.g., i==1). A third node 308 may correspond to the path constraint 314 of the BPUA loop portion 302 with a third value of i (e.g., i==2). The results 310 and 312 correspond to the abort operation.

Figure 4:
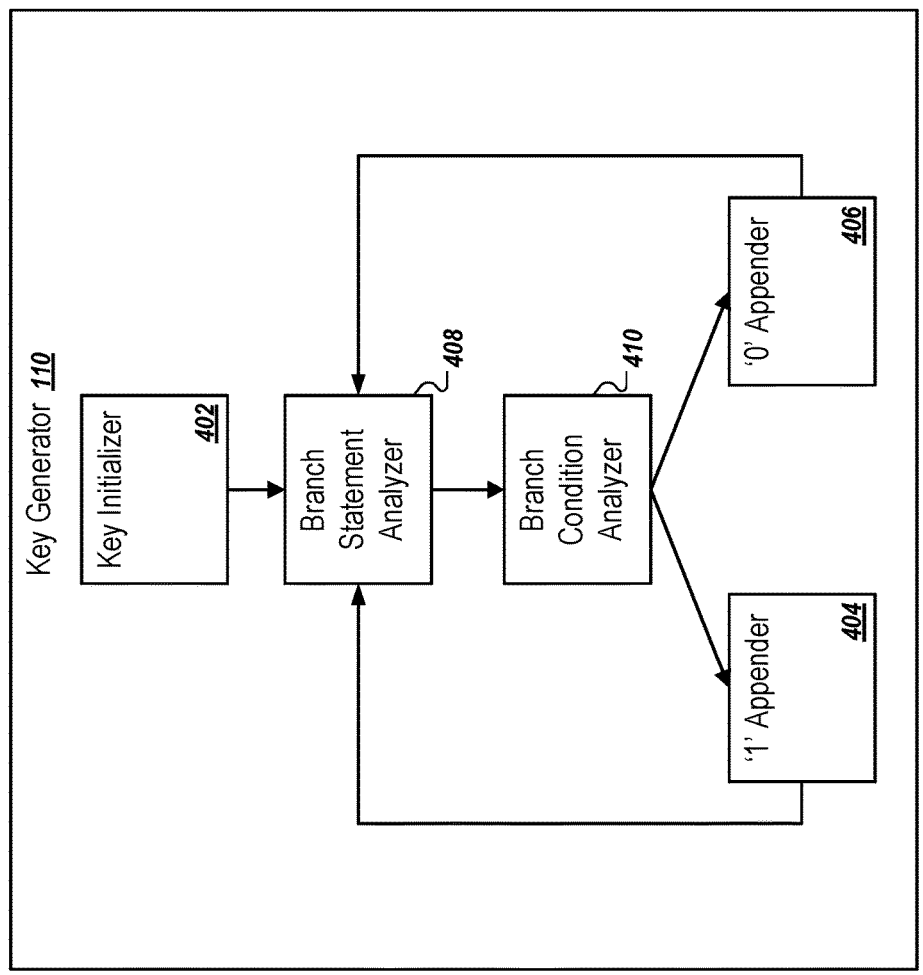
FIG. 4 is a block diagram of an example key generator that may be implemented in the environment of FIG. 1.

FIG. 4 is a block diagram of an example embodiment of the key generator 110 that may be implemented in the environment 100 of FIG. 1. The key generator 110 may be configured to generate the key 120 described with reference to FIG. 1. The key generator 110 may include a key initializer 402, a branch statement analyzer 408, a branch condition analyzer 410, a binary one (1) appender 404 (in FIG. 4, "'1' Appender"), and a binary one (0) appender 406 (in FIG. 4, "'0' Appender").

The key initializer 402 may be configured to set an initial value of a key. Generally, the initial value corresponds to whether a root node is true or false. The root node may be a result of a true branch, which starts the path to the current node. Accordingly, the initial value of the keys is generally a binary one.

The branch statement analyzer 408 may be configured to determine whether the path to the current node includes another branching statement. In response to a determination that there is no additional branching statement, the branch statement analyzer 408 may output the key. In response to a determination that there is an additional branching statement, the branch statement analyzer 408 may communicate an indication to the branch condition analyzer 410. The branch condition analyzer 410 may be configured to determine whether a branch condition is true or false to lead to the current node.

In response to the branching condition being true, the branch condition analyzer 410 may be configured to communicate an indication to the binary one (1) appender 404. The binary one (1) appender 404 may append a binary one (1) to the initial value. In response to the branching condition being false, the branch condition analyzer 410 may be configured to communicate an indication to the binary zero (0) appender 406. The binary zero (0) appender 406 may append a binary zero (0) to the initial value.

The binary zero (0) appender 406 and the binary one (1) appender 404 may communicate the key (with the appended binary zero (0) or the binary one (1)) to the branch statement analyzer 408. The branch statement analyzer 408 may determine whether the path to the current node includes another (e.g., a third) branching statement.

In response to a determination that there is an additional branching statement, the branch statement analyzer 408 may communicate the indication to the branch condition analyzer 410. Otherwise, the key may be output by the branch statement analyzer. The branch condition analyzer 410 may be configured to determine whether another branch condition is true or false. The binary zero (0) appender 406 and the binary one (1) appender 404 may append and a corresponding binary one or zero. This process is repeated until no additional branching statements are present in the path.

Figure 5:
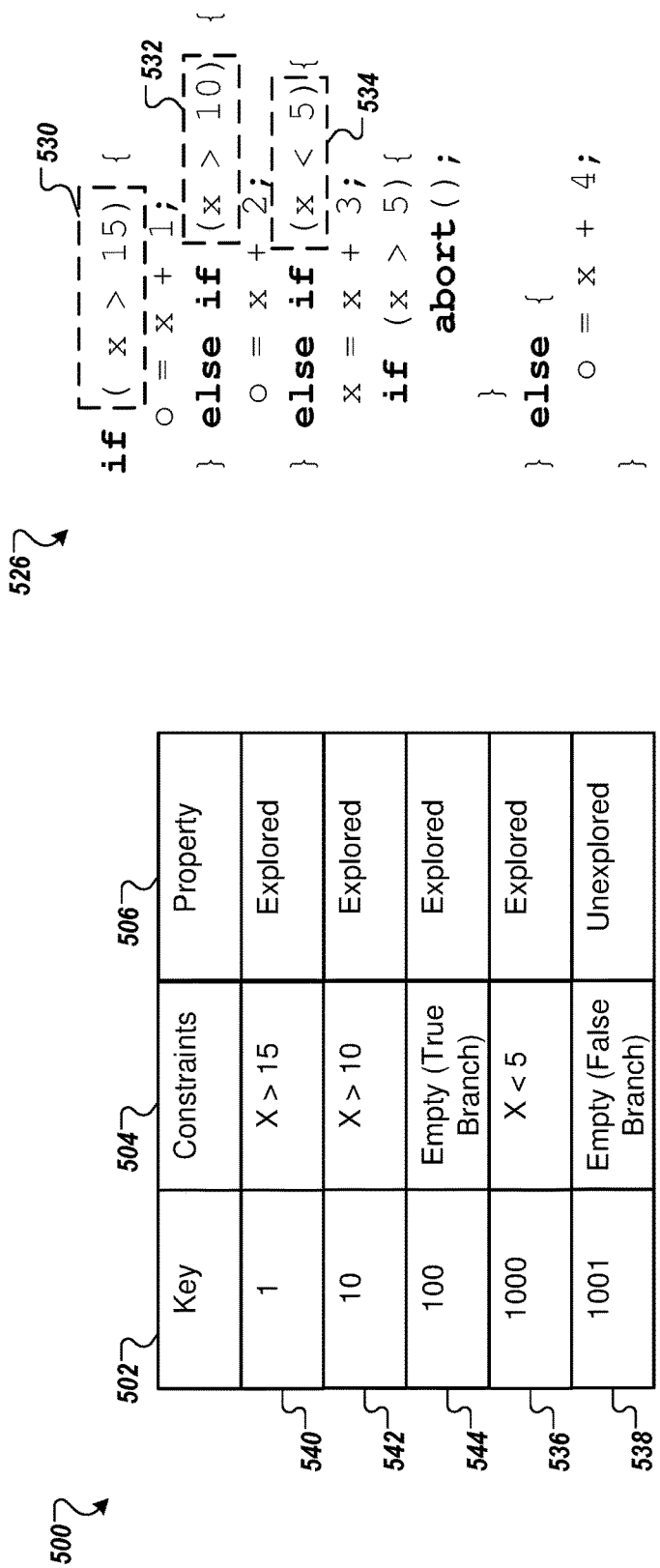
FIG. 5 is a portion of an example graph database that may be implemented in the environment of FIG. 1.

FIG. 5 depicts a portion of an example portion of a graph database (database portion) 500. The database portion 500 may be implemented in the environment of FIG. 1. For instance, the database portion 500 may be a part of the graph database 116 of FIG. 1. The database portion 500 is depicted with a portion of a BPUA (BPUA portion) 526. In the database portion 500, the constraints 504 are listed in a center column. The constraints 504 may be associated with a property 506 and a key 502. For instance, a first key having the value 1 is associated with a first constraint 540 "X>15" that corresponds to a first constraint 530 of the BPUA portion 526. A second key having the value 1-0 is associated with a second constraint 542 "X>10" that corresponds to a second constraint 532 of the BPUA portion 526. A third key having the value 1-0-0 is associated with a third constraint 544 "Empty (True Branch)" that corresponds to a second constraint 532 of the BPUA portion 526. The constraints of a current node 536 may be "X<5," which may correspond to a third constraint 534 of the BPUA portion 526. The current node 536 may be associated with key 1-0-0-0.

For the current node 536, a path may be re-stored by querying one or more of the nodes whose keys are prefixes of the current node 536. The prefixes include each digit or portion of the key of the current node 536. For instance, in the database portion 500, the first constraint 530, the second constraint 542, and the third constraint 544 have keys that are prefixes of the current node 536. Accordingly, the path for the current node 536 may be re-stored by querying the first constraint 530, the second constraint 542, and the third constraint 544.

A negative branch 538 may be included in the BPUA portion 526 and may have a key 1-0-0-1. The negative branch 538 may include a fifth constraint "Empty (False Branch)." A relationship between the negative branch 538 and the current node 536 is a false instead of a true in the fourth node.

Figure 6:
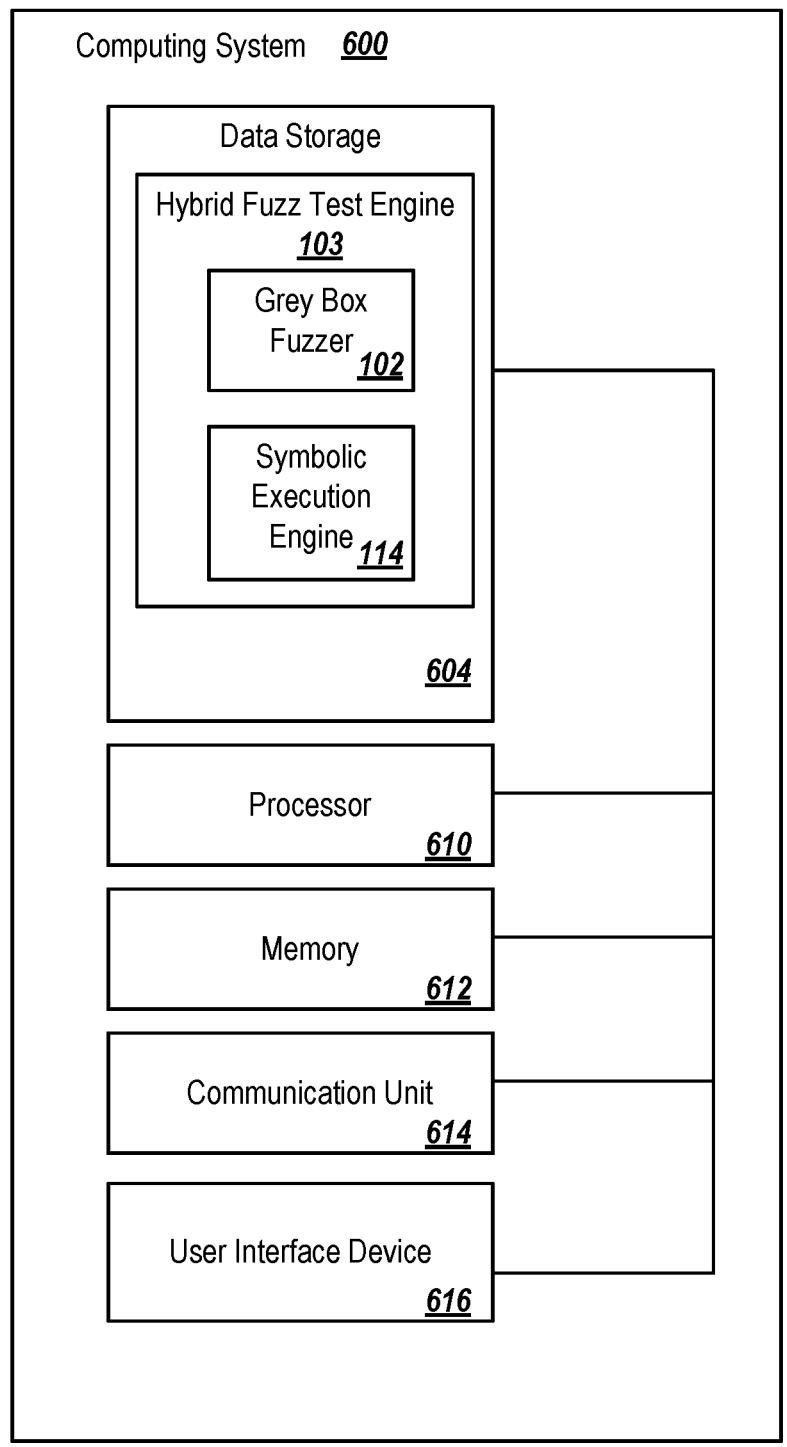
FIG. 6 is a block diagram of an example computing system that may be configured for implementation of an unexplored branch search.

FIG. 6 is a block diagram of an example computing system that may be configured for implementation of an unexplored branch search according to at least one embodiment of the present disclosure. The computing system 600 may be implemented in the environment 100 of FIG. 1, for instance. The computing system 600 may include one or more processors 610, a memory 612, a communication unit 614, a user interface device 616, and a data storage 604 that includes the hybrid fuzz test engine 103, the grey box fuzzer 102, and the symbolic execution engine 114 (collectively, modules 102/103/114).

The processor 610 may include any suitable special-purpose or general-purpose computer, computing entity, or processing device including various computer hardware or software modules and may be configured to execute instructions stored on any applicable computer-readable storage media. For example, the processor 610 may include a microprocessor, a microcontroller, a digital signal processor (DSP), an ASIC, an FPGA, or any other digital or analog circuitry configured to interpret and/or to execute program instructions and/or to process data.

Although illustrated as a single processor in FIG. 6, the processor 610 may more generally include any number of processors configured to perform individually or collectively any number of operations described in the present disclosure. Additionally, one or more of the processors 610 may be present on one or more different electronic devices or computing systems. In some embodiments, the processor 610 may interpret and/or execute program instructions and/or process data stored in the memory 612, the data storage 604, or the memory 612 and the data storage 604. In some embodiments, the processor 610 may fetch program instructions from the data storage 604 and load the program instructions in the memory 612. After the program instructions are loaded into the memory 612, the processor 610 may execute the program instructions.

The memory 612 and the data storage 604 may include computer-readable storage media for carrying or having computer-executable instructions or data structures stored thereon. Such computer-readable storage media may include any available media that may be accessed by a general-purpose or special-purpose computer, such as the processor 610. By way of example, and not limitation, such computer-readable storage media may include tangible or non-transitory computer-readable storage media including RAM, ROM, EEPROM, CD-ROM or other optical disk storage, magnetic disk storage or other magnetic storage devices, flash memory devices (e.g., solid state memory devices), or any other storage medium which may be used to carry or store desired program code in the form of computer-executable instructions or data structures and that may be accessed by a general-purpose or special-purpose computer. Combinations of the above may also be included within the scope of computer-readable storage media. Computer-executable instructions may include, for example, instructions and data configured to cause the processor 610 to perform a certain operation or group of operations.

The communication unit 614 may include one or more pieces of hardware configured to receive and send communications. In some embodiments, the communication unit 614 may include one or more of an antenna, a wired port, and modulation/demodulation hardware, among other communication hardware devices. In particular, the communication unit 614 may be configured to receive a communication from outside the computing system 600 and to present the communication to the processor 610 or to send a communication from the processor 610 to another device or network.

The user interface device 616 may include one or more pieces of hardware configured to receive input from and/or provide output to a user. In some embodiments, the user interface device 616 may include one or more of a speaker, a microphone, a display, a keyboard, a touch screen, or a holographic projection, among other hardware devices.

The modules 102/103/114 may include program instructions stored in the data storage 604. The processor 610 may be configured to load the modules 102/103/114 into the memory 612 and execute the modules 102/103/114. Alternatively, the processor 610 may execute the modules 102/103/114 line-by-line from the data storage 604 without loading them into the memory 612. When executing the modules 102/103/114, the processor 610 may be configured to perform an unexplored branch search as described elsewhere in this disclosure.

Modifications, additions, or omissions may be made to the computing system 600 without departing from the scope of the present disclosure. For example, in some embodiments, the computing system 600 may not include the user interface device 616. In some embodiments, the different components of the computing system 600 may be physically separate and may be communicatively coupled via any suitable mechanism. For example, the data storage 604 may be part of a storage device that is separate from a server, which includes the processor 610, the memory 612, and the communication unit 614, that is communicatively coupled to the storage device. The embodiments described herein may include the use of a special-purpose or general-purpose computer including various computer hardware or software modules, as discussed in greater detail below.

Figure 7A:
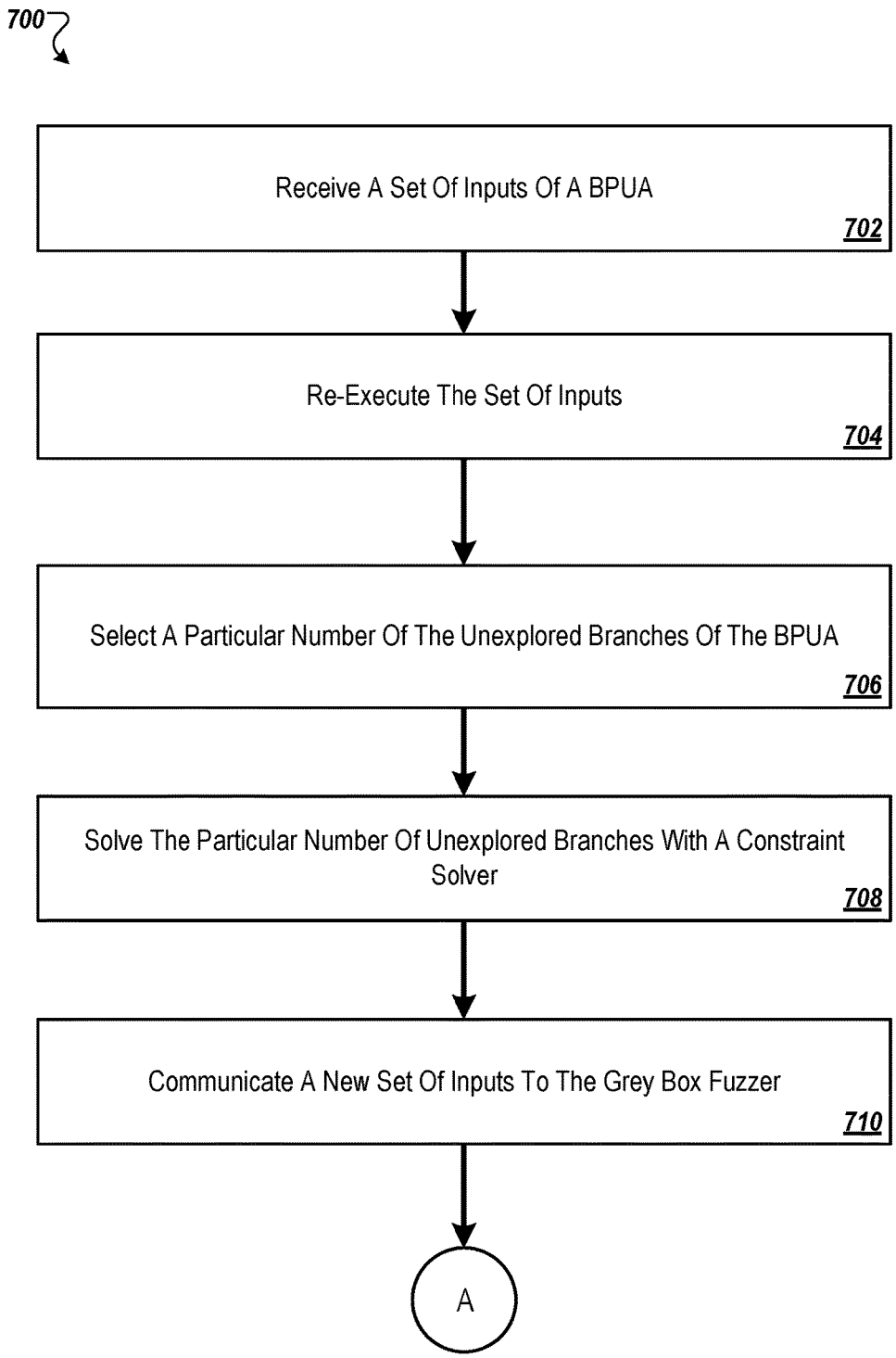
FIGS. 7A and 7B are a flow chart of an example method of branch exploration.
Figure 7B:
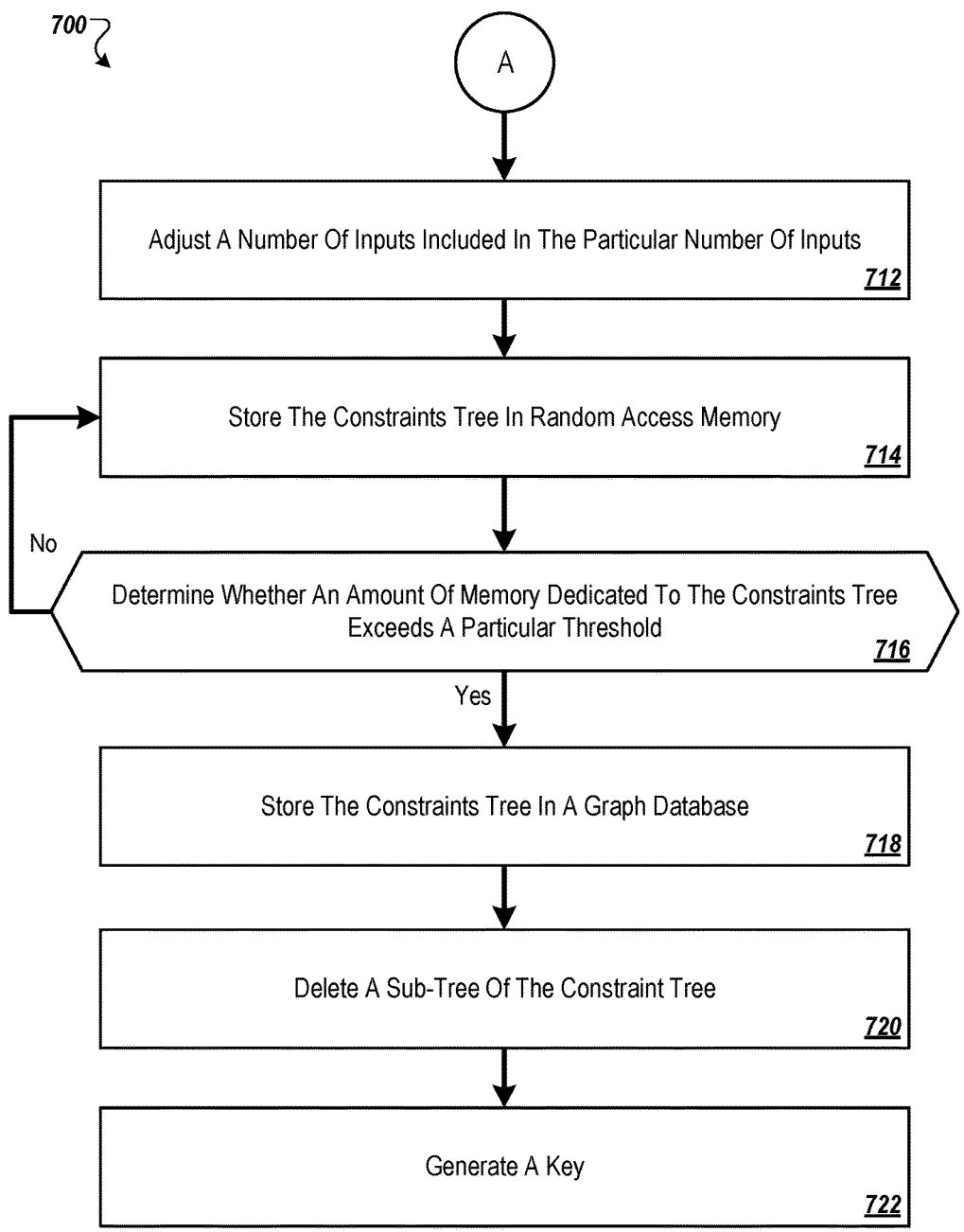

FIGS. 7A and 7B are a flow chart of an example method 700 of branch exploration according to at least one embodiment described in the present disclosure. The method 700 of branch exploration may be implemented during a fuzz testing of a software binary. Although illustrated as discrete blocks, various blocks in FIGS. 7A and 7B may be divided into additional blocks, combined into fewer blocks, or eliminated, depending on the desired implementation.

The method 700 may begin at block 702 in which a set of inputs of a BPUA may be received. The set of inputs may be received by a symbolic execution engine. The set of inputs may be discovered during testing of the BPUA by a grey box fuzzer or another testing process. In some embodiments, the set of inputs of the BPUA include inputs that discovered new paths during testing by the grey box fuzzer.

At block 704, the set of inputs may be re-executed. The set of inputs may be re-executed by the symbolic execution engine in some embodiments. The re-execution of the set of inputs may include a concrete execution of the set of inputs in the BPUA. The re-execution may include formation of a constraints tree in which path constraints along paths of the BPUA and conditions at branch points are recorded and marked as either explored or unexplored.

At block 706, a particular number of the unexplored branches of the BPUA may be selected. The particular number of the unexplored branches of the BPUA may be selected by the symbolic execution engine. At block 708, the particular number of unexplored branches may be solved. The particular number of unexplored branches may be solved by a constraint solver. The particular number of unexplored branches may be solved to generate a new set of the inputs. The new set of inputs may include the particular number of inputs. For instance, in embodiments in which the five unexplored branches of the BPUA are selected, the new set of the inputs may include five inputs.

At block 710, the new set of inputs may be communicated. For instance, the new set of inputs may be communicated to the grey box fuzzer by the symbolic execution engine. The new set of inputs may be used by the grey box fuzzer for exploration of one or more different branches of the BPUA. Referring to FIG. 7B, at block 712, a number of inputs included in the particular number of inputs may be adjusted. For instance, the particular number of inputs may be a small (e.g., three or four) number of inputs. The number of inputs may be increased or decreased to another number of inputs such as eight or nine or another suitable number of inputs.

At block 714, the constraints tree may be stored in random access memory (RAM). Storage of the constraints tree in the RAM may enable relatively rapid access to the constraint tree as opposed to storage of the constraints tree in other types of memory or in remote memory. At block 716, it may be determined whether an amount of memory dedicated to the constraints tree exceeds a particular threshold. In response to an amount of memory dedicated to the constraints tree not exceeding the particular threshold ("NO" at block 716), the method may proceed to block 714, in which the constraints tree is continued to be stored in the RAM. In response to an amount of memory dedicated to the constraints tree exceeding the particular threshold ("YES" at block 716), the method may proceed to block 718. At block 718, the constraints tree may be stored in a graph database. At block 720, one or more sub-trees may be deleted from the constraint tree. At block 722, one or more keys may be generated. The keys may be generated for one or more path constraints in the graph database. The keys may include a string or a bit vector data that is mapped to the path constraints. The keys may indicate a sequence of true and false nodes along the path to reach a current node that corresponds to the path constraints from a root node. The root node may be a result of a true branch.

One skilled in the art will appreciate that, for this and other procedures and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the disclosed embodiments.

Figure 8:
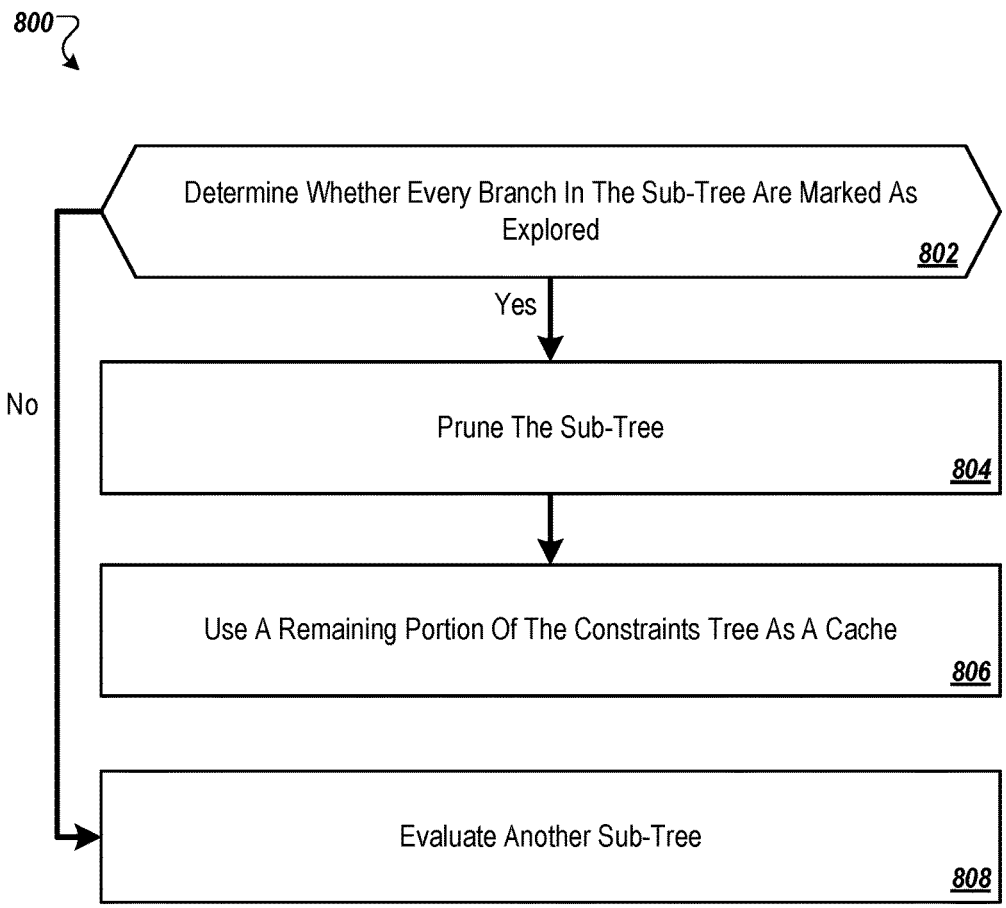
FIG. 8 is a flow chart of an example method of sub-tree deletion.

FIG. 8 is a flow chart of an example method 800 of subtree deletion according to at least one embodiment described in the present disclosure. In some embodiments, the method 800 may be implemented as a part of another method. For instance, the method 800 may be implemented as block 720 of the method 700 described above. Although illustrated as discrete blocks, various blocks in FIG. 8 may be divided into additional blocks, combined into fewer blocks, or eliminated, depending on the desired implementation.

The method 800 may begin at block 802 in which it is determined whether some or every branch in a sub-tree of a constraint tree are marked as explored. In response to a determination that every branch in the sub-tree not being marked as explored ("NO" at block 802), the method 800 may proceed to block 808 in which another sub-tree is evaluated for deletion. In response to a determination that every branch in the sub-tree is marked as explored ("YES" at block 802), the method 800 may proceed to block 804. At block 804, the sub-tree may be pruned. At block 806, a remaining portion of the constraints tree may be used as a cache.

Figure 9:
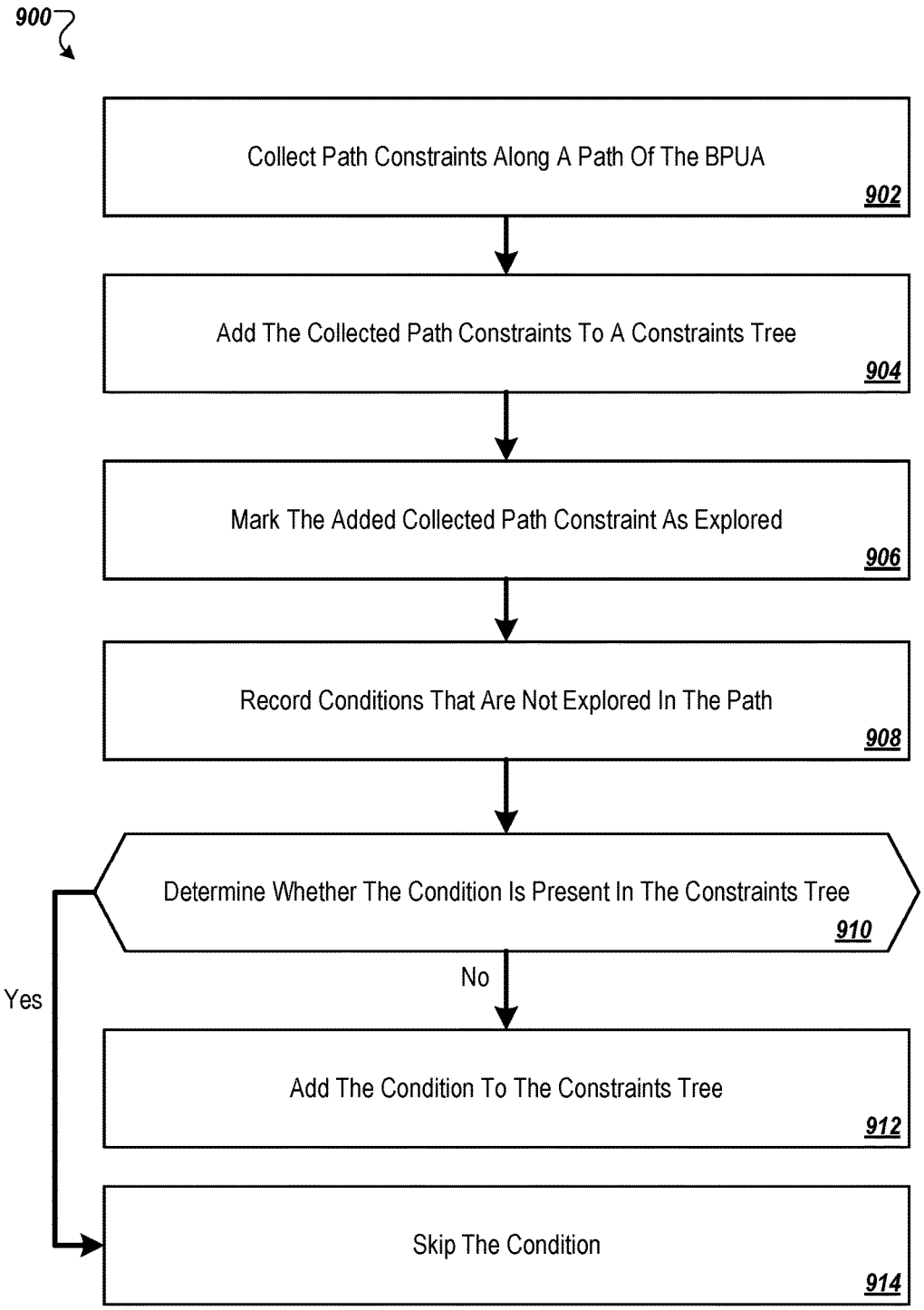
FIG. 9 is a flow chart of an example method of input re-execution.

FIG. 9 is a flow chart of an example method 900 of input re-execution according to at least one embodiment described in the present disclosure. In some embodiments, the method 900 may be implemented as a part of another method. For instance, the method 900 may be implemented as at least part of block 704 of the method 700 described above. Although illustrated as discrete blocks, various blocks in FIG. 9 may be divided into additional blocks, combined into fewer blocks, or eliminated, depending on the desired implementation. The method 900 may be performed for one or more or each input of a set of inputs.

The method 900 may begin at block 902 in which path constraints may be collected along a path of a BPUA. The path constraints include the expressions included in the BPUA that dictate or determine progress through subsequent paths. At block 904, the collected path constraints may be added to a constraints tree.

At block 906, the added collected path constraints may be marked as explored. At block 908, conditions that are not explored in the path may be recorded. The conditions may be recorded at one or more or each of the branch points. At block 910, it may be determined whether the condition is present in the constraints tree. In response to the condition being present in the constraints tree ("YES" at block 910), the method 900 may process to block 914. In response to the condition not being present in the constraints tree ("NO" at block 910), the method 900 may process to block 912. At block 914, the condition may be skipped. At block 912 the condition may be added to the constraints tree.

Figure 10A:
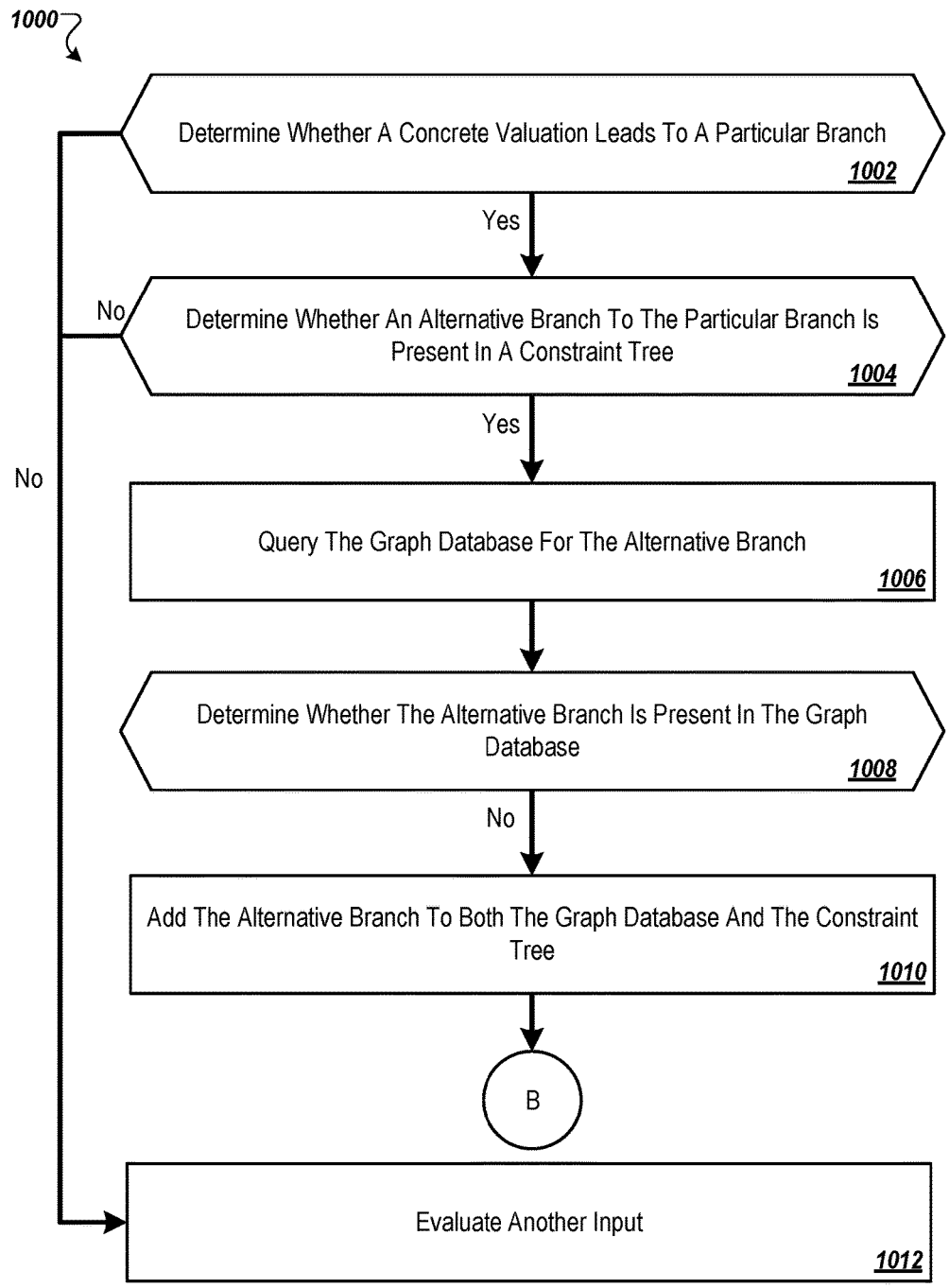
FIGS. 10A and 10B are a flow chart of another example method of input re-execution.
Figure 10B:
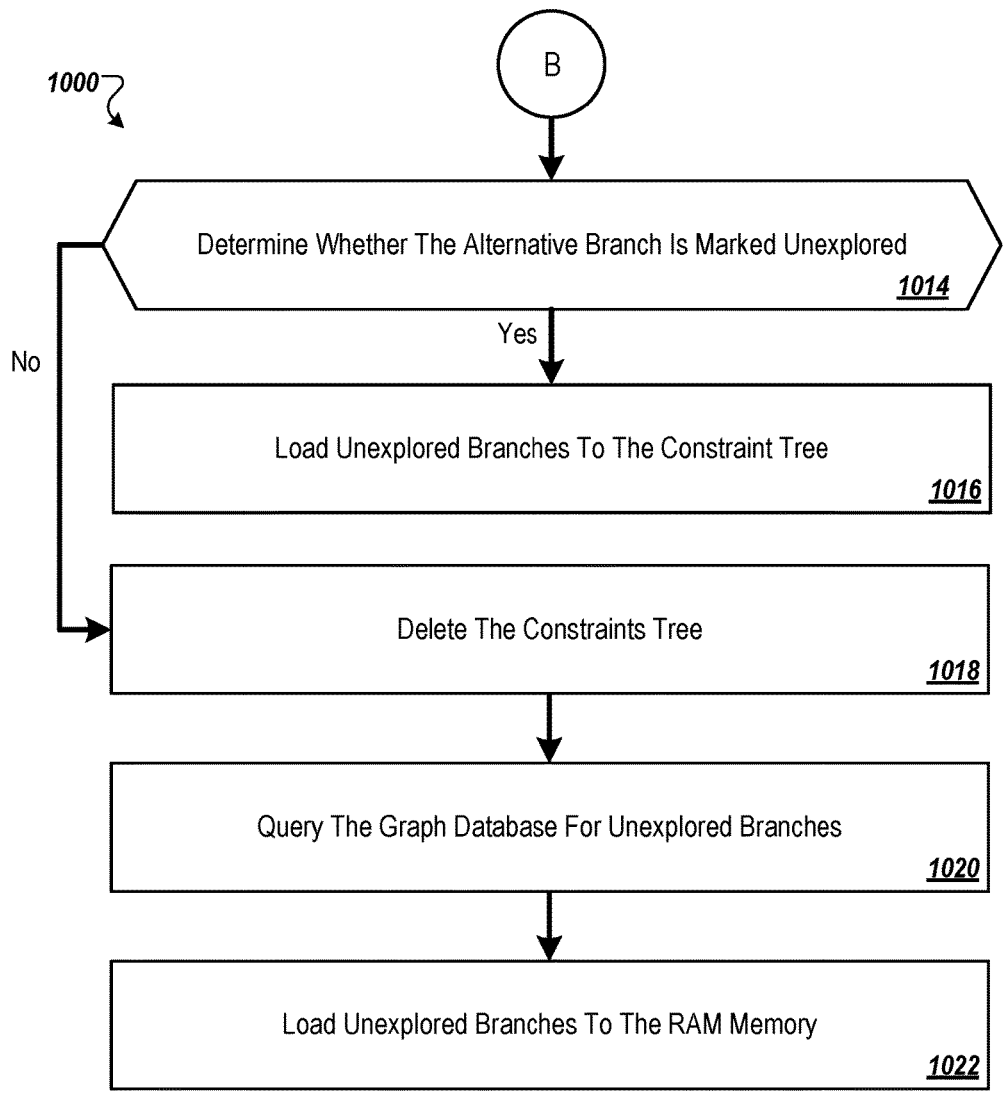

FIGS. 10A and 10B are a flow chart of another example method 1000 of input re-execution according to at least one embodiment described in the present disclosure. The method 1000 may be implemented after a constraints tree is stored in a graph database. In some embodiments, the method 1000 may be implemented as a part of another method. For instance, the method 1000 may be implemented as block 704 of the method 700 described above. Although illustrated as discrete blocks, various blocks in FIGS. 10A and 10B may be divided into additional blocks, combined into fewer blocks, or eliminated, depending on the desired implementation.

The method 1000 may begin at block 1002 in which it may be determined whether a concrete valuation of an input leads to a particular branch. The input may be one input of a set of inputs. The concrete valuation may be based on the input being a particular value that is assigned to a variable in the BPUA. From the concrete valuation, it may be determined whether the input leads to the particular branch. For instance, a portion of a BPUA may include expressions:

int Funct( ) {
    X=read ( );
    Z=X^2;
    if (z==11) {fail ( );}
    else {printf ("done");}}

The input X may be equal to three. The concrete valuation of the input leads to the path that includes the printing of "done." Accordingly, the concrete valuation of the input of 3 leads to the particular path that includes the printing of done.

In response to a determination that the input leads to the particular path ("YES" at block 1002), the method 1000 may proceed to block 1004. In response to a determination that the input does not lead to the particular path ("NO" at block 1002), the method 1000 may proceed to block 1012. At block 1012, another input of the set of inputs may be selected. From block 1012, the method 1000 may proceed to one or more of blocks 1002, 1004, 1006, 1008, 1010, 1014, 1016, 1018, 1020, 1022, or some combination thereof.

At block 1004, it may be determined whether an alternative branch to the particular branch is present in a constraints tree. The alternative branch may be the branch other than the particular branch to which the input leads. For instance, from the example above, the alternative branch may include the "fail" branch.

In response to the alternative branch not being present in the constraints tree ("NO" at block 1004), the method 1000 may proceed to block 1012. In response to the alternative branch being present in the constraints tree ("YES" at block 1004), the method 1000 may proceed to block 1006. At block 1006, the graph database may be queried for the alternative branch. At block 1008, it may be determined whether the alternative branch is present in the graph database.

In response to the alternative branch not being present in the graph database and not being present in the constraints tree, at block 1010, the alternative branch may be added to both the graph database and the constraint tree.

Referring to FIG. 10B, at block 1014, it may be determined whether the alternative branch is marked unexplored. In response to the alternative branch not being present in the graph database ("NO" at block 1008) and marked as unexplored ("YES" at block 1014), the method 1000 may proceed to block 1016. At block 1016, the alternative branch may be loaded to the constraints tree. In response to the constraints tree being explored ("NO" at block 1014), the method 1000 may proceed to block 1018. At block 1018, the constraints tree may be deleted. At block 1020, the graph database may be queried for unexplored branches. At block 1022, unexplored branches may be loaded to RAM memory.

Figure 11:
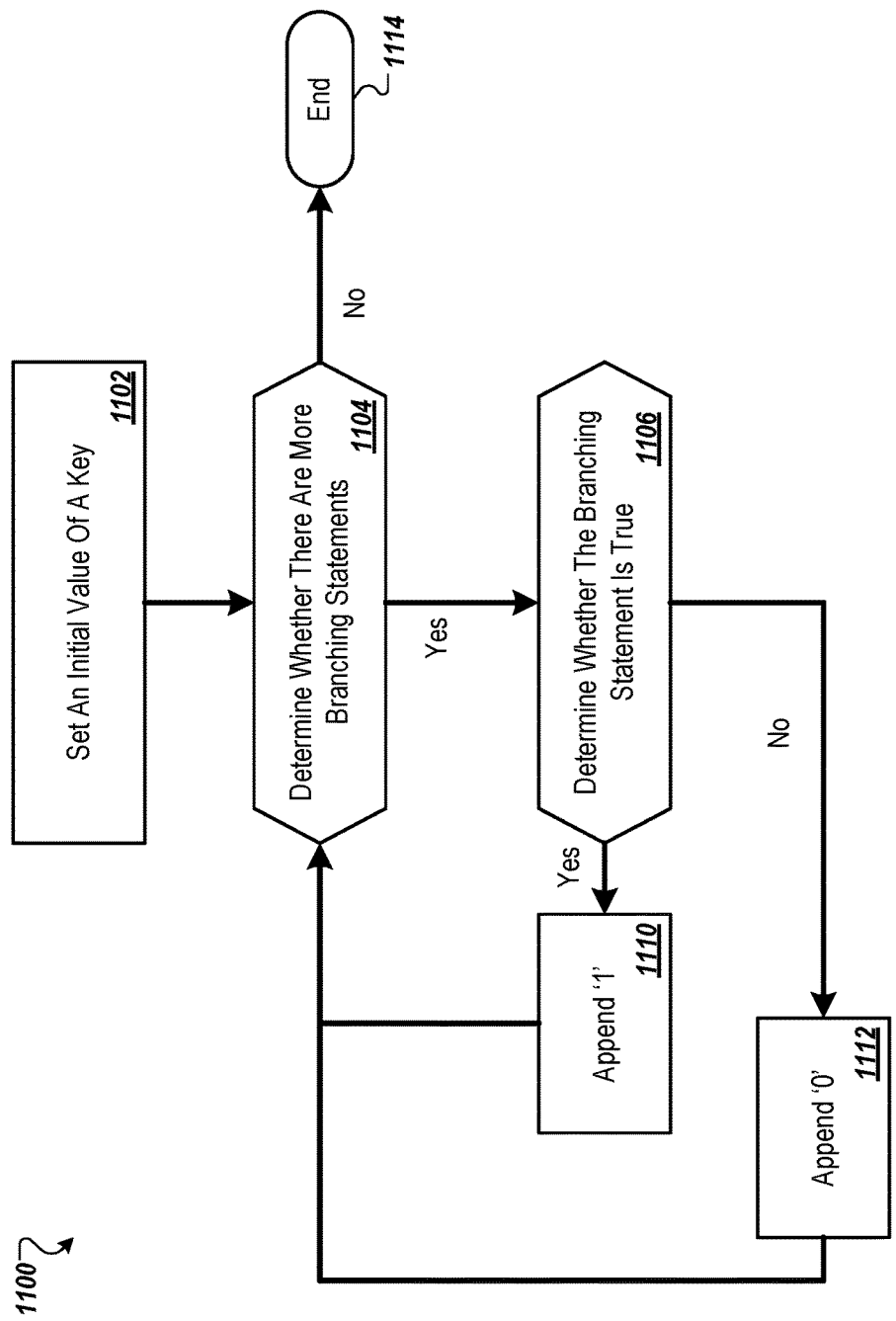
FIG. 11 is a flow chart of an example method of key generation, all according to at least one embodiment described in the present disclosure.

FIG. 11 is a flow chart of an example method 1100 of key generation according to at least one embodiment described in the present disclosure. In some embodiments, the method 1100 may be implemented as a part of another method. For instance, the method 1100 may be implemented as block 722 of the method 700 described above. Although illustrated as discrete blocks, various blocks in FIG. 11 may be divided into additional blocks, combined into fewer blocks, or eliminated, depending on the desired implementation.

The method 1100 may begin at block 1102 in which an initial value of a key may be set. The key may be generated for a node in a constraints tree. The key may represent a sequence of true and false nodes between a root node and the node. The initial value of the key may be set to 1, which may reflect that the root node is true.

At block 1104, it may be determined whether there are more branching statements. For example, between the root node and the node for which the key is generated may include multiple branching statements. At block 1104, it is determined whether the progress of key generation has reached the node for which the key is generated or between the root node and the node for which the key is generated. In response to there being no more branching statements ("NO" at block 1104), the method 1100 may proceed to block 1114 in which the method 1100 ends. At block 1114, the key may be assigned to the node. The key may then be associated with the node and entered into a database such as the database 116 of FIG. 1. The key may then be used to query other nodes and paths in the graph database. For instance, paths with identical portions of code may include the same key. Accordingly, the key may indicate whether the key has been addressed and/or entered in the database.

In response to there being another branching statement ("YES" at block 1104), the method may proceed to block 1106. At block 1106, it may be determined whether the branching statement is true. In response to the branching statement being true ("YES" at block 1106), the method 1100 may proceed to block 1110. At block 1110, a '1' may be appended to the key. For instance, the key may be 1-1, which may indicate a true root node and a subsequent true node. From block 1110, the method 1100 may proceed to block 1104. The method 1100 may then proceed through one or more of blocks 1106, 1110, 1112, 1114, or some combination thereof. In response to the branching statement being false ("NO" at block 1106), the method 1100 may proceed to block 1112.

At block 1112, a '0' may be appended to the key. For instance, the key may be 1-0, which may indicate a true root node and a subsequent false node. From block 1112, the method 1100 may proceed to block 1104. The method 1100 may then proceed through one or more of blocks 1106, 1110, 1112, 1114, or some combination thereof. The method 1100 may continue until it is determined at block 1104 that there are no more branching statements.

The methods 700, 800, 900, 1000, and 1100 may be performed in an environment such as the environment 100 of FIG. 1. The methods 700, 800, 900, 1000, and 1100 may be programmably performed in some embodiments by the symbolic execution engine 114 described with reference to FIG. 1 or the computing system 600 of FIG. 6. In some embodiments, a computing system (e.g., 600) including the symbolic execution engine 114 may include or may be communicatively coupled to a non-transitory computer-readable medium (e.g., the memory 612 of FIG. 6) having stored thereon programming code or instructions that are executable by one or more processors (such as the processor 610 of FIG. 6) to cause a computing system to perform or control performance of the methods 700, 800, 900, 1000, 1100, or some combination thereof. Additionally or alternatively, a computing system (e.g., 600) including the symbolic execution engine 114 may include the processor 610 described elsewhere in this disclosure that is configured to execute computer instructions to cause the computing system to perform or control performance of the methods 700, 800, 900, 1000, 1100, or some combination thereof.

The embodiments described herein may include the use of a special-purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general-purpose or special-purpose computer. By way of example, and not limitation, such computer-readable media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. In these and other embodiments, the term "non-transitory" as explained herein should be construed to exclude only those types of transitory media that were found to fall outside the scope of patentable subject matter in the Federal Circuit decision of In re Nuijten, 500 F.3d 1346 (Fed. Cir. 2007). Combinations of the above may also be included within the scope of computer-readable media.

Computer-executable instructions comprise, for example, instructions and data which cause a general-purpose computer, special-purpose computer, or special-purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general-purpose hardware (e.g., computer-readable media, processing devices, etc.) of the computing system. In some embodiments, the different components, modules, engines, and services described herein may be implemented as objects or processes that execute on the computing system (e.g., as separate threads).

While some of the system and methods described herein are generally described as being implemented in software (stored on and/or executed by general-purpose hardware), specific hardware implementations or a combination of software and specific hardware implementations are also possible and contemplated. In this description, a "computing entity" may be any computing system as previously defined herein, or any module or combination of modulates running on a computing system.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A method of branch exploration in fuzz testing of software binaries, the method comprising:
   receiving, by a symbolic execution engine, a set of inputs of a binary program under analysis (BPUA) that is discovered during testing by a grey box fuzzer;
   re-executing, by the symbolic execution engine, the set of inputs, the re-executing including a concrete execution of the set of inputs in the BPUA and formation of a constraints tree in which path constraints along paths of the BPUA and conditions at branch points are recorded and marked as either explored or unexplored;

storing the constraints tree in random access memory;

in response to an amount of memory dedicated to the constraints tree exceeding a particular threshold:
  storing the constraints tree in a graph database;

selecting, by the symbolic execution engine, a particular number of the unexplored branches of the BPUA;

solving, by the symbolic execution engine, the particular number of the unexplored branches with a constraint solver to generate a new set of the particular number of inputs;

communicating, by the symbolic execution engine, the new set of inputs to the grey box fuzzer for exploration of one or more different branches of the BPUA, the new set of inputs including the particular number of new inputs; and deleting a sub-tree of the constraints tree.

2. The method of claim 1, further comprising adjusting a number of inputs included in the particular number of inputs.

3. The method of claim 1, wherein the re-executing includes:
  for each input of the set of inputs, collecting path constraints along a path of the BPUA;
  adding the collected path constraints to a constraints tree; and
  marking the added collected path constraint as explored.

4. The method of claim 3, wherein the re-executing further includes:
  at each of the branch points, recording conditions that are not explored in the path;
  in response to the condition being present in the constraints tree, skip the condition; and
  in response to the condition not being present in the constraints tree, adding the condition to the constraints tree.

5. The method of claim 1, wherein the set of inputs of the BPUA include inputs that discovered new paths during testing by the grey box fuzzer.

6. The method of claim 1, wherein the deleting the sub-tree includes:
  determining whether every branch in the sub-tree are marked as explored;
  in response to a determination that every branch in the sub-tree being marked as explored, pruning the sub-tree; and
  using a remaining portion of the constraints tree as a cache.

7. The method of claim 6, wherein after the constraints tree is stored in the graph database, the re-executing includes:
  determining whether a concrete valuation of an input of the set of inputs leads to a particular branch; and
  in response to the concrete valuation of the input leading to the particular branch:
    determining whether an alternative branch to the particular branch is present in the constraints tree;
    in response to the alternative branch not being present in the constraints tree, querying the graph database for the alternative branch;
    in response to the alternative branch not being present in the graph database and not being present in the constraints tree, adding the alternative branch to both the graph database and the constraints tree;
    in response to the alternative branch not being present in the graph database and marked as unexplored, loading the alternative branch to the constraints tree; and
    in response to the constraints tree being explored, deleting the constraints tree, querying the graph database for unexplored branches, and loading unexplored branches to RAM.

8. The method of claim 1, further comprising generating a key for each of the path constraints in the graph database, wherein:
  the key includes a string or a bit vector data that is mapped to the path constraints;
  the key indicates a sequence of true and false nodes along the path to reach a current node that corresponds to the path constraints from a root node; and
  the root node is a result of a true branch.

9. The method of claim 8, wherein the generating the key includes:
  setting an initial value of the key to 1;
  in response to branching statement include more branching statements, determining whether a branch condition is true;
  in response to the branching condition being true, appending a 1 to the initial value; and
  in response to the branching condition being untrue, appending a 0 to the initial value.

10. A non-transitory computer-readable medium having encoded therein programming code executable by one or more processors to perform or control performance of operations comprising:
  receiving a set of inputs of a binary program under analysis (BPUA) that is discovered during testing by a grey box fuzzer;
  re-executing the set of inputs, the re-executing including a concrete execution of the set of inputs in the BPUA and formation of a constraints tree in which path constraints along paths of the BPUA and conditions at branch points are recorded and marked as either explored or unexplored;
  storing the constraints tree in random access memory;
  in response to an amount of memory dedicated to the constraints tree exceeding a particular threshold:
    storing the constraints tree in a graph database;
  selecting a particular number of the unexplored branches of the BPUA;
  solving the particular number of the unexplored branches with a constraint solver to generate a new set of the particular number of inputs;
  communicating the new set of inputs to the grey box fuzzer for exploration of one or more different branches of the BPUA, the new set of inputs including the particular number of new inputs; and
  deleting a sub-tree of the constraints tree.

11. The non-transitory computer-readable medium of claim 10, wherein the operations further include adjusting a number of inputs included in the particular number of inputs.

12. The non-transitory computer-readable medium of claim 10, wherein the re-executing includes:
  for each input of the set of inputs, collecting path constraints along a path of the BPUA;
  adding the collected path constraints to a constraints tree; and
  marking the added collected path constraint as explored.

13. The non-transitory computer-readable medium of claim 12, wherein the re-executing further includes:

at each of the branch points, recording conditions that are not explored in the path;

in response to the condition being present in the constraints tree, skip the condition; and in response to the condition not being present in the constraints tree, adding the condition to the constraints tree.

14. The non-transitory computer-readable medium of claim 10, wherein the set of inputs of the BPUA include inputs that discovered new paths during testing by the grey box fuzzer.

15. The non-transitory computer-readable medium of claim 10, wherein the deleting the sub-tree includes:

determining whether every branch in the sub-tree are marked as explored;

in response to a determination that every branch in the sub-tree being marked as explored, pruning the sub-tree; and using a remaining portion of the constraints tree as a cache.

16. The non-transitory computer-readable medium of claim 15, wherein after the constraints tree is stored in the graph database, the re-executing includes:

determining whether a concrete valuation of an input of the set of inputs leads to a particular branch; and in response to the concrete valuation of the input leading to the particular branch:

determining whether an alternative branch to the particular branch is present in the constraints tree;

in response to the alternative branch not being present in the constraint tree, querying the graph database for the alternative branch;

in response to the alternative branch not being present in the graph database and not being present in the constraints tree, adding the alternative branch to both the graph database and the constraints tree;

in response to the alternative branch not being present in the graph database and marked as unexplored, loading the alternative branch to the constraints tree; and in response to the constraints tree being explored, deleting the constraints tree, querying the graph database for unexplored branches, and loading unexplored branches to RAM.

17. The non-transitory computer-readable medium of claim 10, wherein:

the operations further comprise generating a key for each of the path constraints in the graph database;

the key includes a string or a bit vector data that is mapped to the path constraints;

the key indicates a sequence of true and false nodes along the path to reach a current node that corresponds to the path constraints from a root node; and the root node is a result of a true branch.

18. The non-transitory computer-readable medium of claim 17, wherein the generating the key includes:

setting an initial value of the key to 1;

in response to branching statement including more branching statements, determining whether a branch condition is true;

in response to the branching condition being true, appending a 1 to the initial value; and in response to the branching condition being untrue, appending a 0 to the initial value.

* * * * *